3,166,525
COPOLYMERS OF N-VINYL-2-PYRROLIDONES AND VINYL ESTERS AS EMULSIONS OR LATICES
William M. Perry, Bethlehem, Pa., assignor to General Aniline & Film Corporation, New York, N.Y., a corporation of Delaware
No Drawing. Filed May 11, 1959, Ser. No. 812,108
10 Claims. (Cl. 260—29.6)

This invention relates to a new and novel process of preparing copolymers of N-vinyl pyrrolidones with vinyl esters as emulsions or latices and to such materials or latices.

It is known in the polymer art that various polymerizable monomers may be either homopolymerized or copolymerized in bulk, in solvents or in emulsion to yield a variety of products having specific utility in the industrial arts. In the emulsion polymerization of a single polymerizable monomer or mixed polymerizable monomers, it is necessary to employ an emulsifying agent. In other words, the reactants or coreactants are polymerized in an aqueous emulsion containing in addition to the catalyst or initiator an emulsifier. As emulsifiers, various soaps and surface active agents have been employed, such as for example, lauryl sodium sulfonate, sodium oleate, sodium salts of paraffinic fatty acids, N-diethyl monoethyl esters of long chain paraffinic acids, sulfonated products derived from $C_{14}$ to $C_{17}$ Fischer-Tropsch long chain hydrocarbon fractions via Reed process and Mepasin sulfoamido acetic acid.

Polymers and copolymers of N-vinyl-2-pyrrolidones have and are being prepared either in bulk or in organic solvent, preferably the latter. The polymers of vinyl acetate may be produced not only in bulk and in organic solvents but also in aqueous dispersions (emulsions). This emulsion process is well known and need not be described herein. Emulsions of polyvinyl acetate are not true latices but coarser dispersions. Practically all of the polyvinyl acetate aqueous dispersions or emulsions are prepared in persulfate emulsion in the presence of a small amount of sodium vinyl sulfonate and the commercially available surfactants as dispersing agents.

I have found that N-vinyl pyrrolidones and vinyl esters may be copolymerized in an aqueous system in the presence of the usual catalysts without the need of emulsifying or dispersing agents to yield emulsions or latices of the copolymers. In other words, I have found that such copolymeric emulsions can be prepared without requiring the use of either a protective colloid or surface active agent during the copolymerization process. Accordingly, it is the principal object of the present invention to provide such emulsions or latices and a process of preparing the same.

Other objects and advantages will become more clearly manifest from the following description.

In accomplishing the foregoing objects, I discovered that such emulsions or latices are prepared by copolymerizing 1.0 to 1.5 moles of an N-vinyl-2-pyrrolidone with 1.3 to 2.0 moles of vinyl ester in an aqueous system containing any of the currently employed peroxide catalysts, i.e. low temperature types, intermediate temperature types and high temperature types, including free-radical initiators such as the aliphatic azo catalyst $\alpha,\alpha'$-azodiisobutyronitrile. Any suitable container containing the aforesaid mixture is then heated at gentle reflux in the presence of an inert gas such as nitrogen, carbon dioxide, "flue" combustion gas, and other inert gases of relatively low oxygen content and the contents stirred to insure complete mixing of the coreactants.

At certain regular intervals additional amounts of catalysts are added to insure a high level of free-radicals during the course of the copolymerization. After 5 to 6 hours, the unsaturation in the two monomers is reduced to an acceptable level (i.e. usually less than 1% by weight). A viscous, stable, white emulsion is obtained which can be very readily extended with water or with various commercial polyvinyl esters. The emulsion may be diluted and then passed through a spray dryer to yield a white powdered copolymer. In general, the process involves any suitable container equipped with a stirrer, a thermometer, an inert gas inlet, a reflux condenser and a heating source for the container. The temperature is maintained substantially below the boiling point of water to avoid the "breaking" of the emulsion.

The copolymers formed in a stable emulsion by the process of this invention are quite different and distinct from those prepared in bulk or in an organic solvent. For example, a copolymer containing 40% by weight of N-vinyl-2-pyrrolidone, 60% of vinyl ester prepared in ethanol gives a clear solution and a Fikentscher K value of about 30–35 in ethanol. The same copolymer prepared as an emulsion in accordance with the process of this invention gives a Fikentscher K value of 55 in ethanol. These differences clearly indicate that the molecular weight of the copolymers obtained in accordance with the present invention are greatly changed. In other words, higher molecular weight copolymers are obtained.

Another distinct and marked difference is that when the copolymers prepared in accordance with the present invention are spray dried, they can be readily reemulsified by simple stirring into water, whereas the similar solvent prepared copolymers are very difficultly, if at all emulsified. The distinct advantage of the process of the present invention is that it provides a unique method of manufacturing economically an emulsion which can conveniently be spray dried to yield a powdered product. As is well known, in order to obtain a dry powdered copolymer prepared in an organic liquid, it is necessary to evaporate the liquid under special conditions and pulverizing the resulting product or grinding in a mill. It is well appreciated by persons skilled in the polymer art that it is exceedingly difficult to grind polymers and copolymers to small powders. In addition, by the process of the present invention, it is possible to obtain a product with a much higher molecular weight than when the same copolymer is prepared in organic solvents.

The emulsion form of the copolymers prepared in accordance with the present invention has the unique advantage compared to the organic solvent form in that it presents no fire hazard and thereby can be used in many places in which an organic system would be prohibited. For example, this emulsion could be used as a sizing agent in a mill and it would not be a fire hazard. It could be used to size hot glass fibers whereas the organic system could not be used. It is significant to note that either the emulsion or the dried copolymer can be used as a protective colloid in emulsions, chemical processes, cosmetics, household polishes, and emulsion polymerization processes and the like.

Another advantage is that the fumes and odors from the emulsion would not present the health hazard as would certain organic systems such as a benzene solution. The benzene vapors are quite toxic. The emulsion form also can be used as an adjunct with certain other emulsions in which an organic liquid system could not be used or would be compatible with the other emulsion.

From the foregoing description, it is clearly evident that the process of the present invention permits the economic production of a dry polymeric powder by spray drying the emulsion. The resulting dry powder offers considerable advantages in that it can be shipped in a concentrated form (i.e. no solvent or water), and readily re-emulsified by stirring into water to again yield a stable emulsion.

Accordingly, the dry powder can be shipped more cheaply and economically than organic solvent solutions of such copolymers.

Another unusual feature of the emulsion copolymers of the present invention is that they are readily compatible with commercially available polyvinyl acetate emulsions, and as a consequence, upgrade them. The emulsions of the present invention are particularly useful as textile and other finishes. They are also useful as anti-snag finishes for hosiery and as film forming adhesives and finishes. They are particularly adapted as sizings for glass cloth and fibres and as adhesives, and as vehicles for heat-set inks and specialty paints. They are particularly adaptable as adhesive base materials for paper, cellophane, cloth, leather, cork, wood, ceramics, metals and certain plastics. Bonds can be made with such adhesives both by the wet-bond and heat-sealing methods. For absorbent materials, the wet-bond method is satisfactory; for non-absorbent materials, however, such method is not practical because of the long time required for the water to evaporate and to develop the full strength of the bond.

These emulsions appear useful in the preparation of cores for foundry work. Another use of these materials as a binder is the preparation of a film comprising scrap leather, wood, flour, asbestos, etc., and the copolymer when pressed and dried.

With the proper plasticizer, these emulsions can be coated onto a substrate (plastic film, cloth, glass cloth, cellophane, etc.) to give a pressure sensitive tape which is especially useful on appliances. Such pressure sensitive tape can also be removed by either soap or detergent and water.

The application of these emulsions to nylon stockings showed improved snag resistance, bond and appearance. By adding these emulsions to paper, either as a finish coat or as an ingredient in the pulp stage, the printability, the wet strength, grease and oil resistance are improved.

These emulsions can be emulsified with aerosol propellants ("Freons") and sprayed from an aerosol container to set or style human hair as described in U.S. Patent 2,524,590.

As illustrative examples of N-vinyl pyrrolidones which may be copolymerized with various vinyl esters in the aforestated proportions, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
3-ethyl-N-vinyl-2-pyrrolidone
4-methyl-N-vinyl-2-pyrrolidone
4-ethyl-N-vinyl-2-pyrrolidone
3-phenyl-3-$\beta$-diethylamine-ethyl-N-vinyl-2-pyrrolidone
5-hydroxy methyl-N-vinyl-2-pyrrolidone The vinyl esters of an acid of the fatty acid series containing from 1 to 18 carbon atoms which are copolymerized with the foregoing N-vinyl pyrrolidones are the following:

Vinyl acetate
Vinyl chloracetate
Vinyl formate
Vinyl propionate
Vinyl butyrate
Vinyl caprolate
Vinyl laurate
Vinyl oleate
Vinyl stearate The following examples will describe in greater detail the process involved in preparing new and novel polymeric emulsions or latices.

EXAMPLE I

Into a five-liter, three-necked, Pyrex flask equipped with a thermometer, a reflux condenser, a stirrer, a nitrogen inlet, and an electric heating mantle were charged 800.0 grams of distilled water, 480.0 grams of distilled vinyl acetate, 320.0 grams of distilled 1-vinyl-2-pyrrolidone, 0.8 gram of lauroyl peroxide and 0.4 gram of 2,2'-azodiisobutyronitrile.

The flask was flushed with nitrogen and the inlet rate adjusted to about 30 bubbles per minute. The flask was then heated to about 71° C. to give a gentle reflux and maintained at this temperature for 7 hours. Also the mixture was stirred vigorously during the entire course of the reaction. Additional charges of catalyst were added at hourly intervals for 5 hours. The catalyst added each hour was 0.8 gram of lauroyl peroxide and 0.4 gram of 2,2'-azodiisobutyronitrile.

At the beginning of the reaction the reactants gave a two-phase liquid system. As the reaction proceeded, a white, milky emulsion formed. In the latter part of the reaction, a stable, white emulsion formed. A solids determination of the emulsion at the end of 5 hours gave a conversion and yield of 96% or better which indicated the reaction was practically complete.

The final product was a white emulsion with a viscosity of 80,000 cp. determined with a Brookfield Viscometer. Analysis of nitrogen indicated the copolymer contained 40.8% 1-vinyl-2-pyrrolidone. Analysis for saponification value indicated the copolymer contained 55.2% vinyl acetate. A solids analysis showed the emulsion contained 48% solids. The dried copolymer also gave a Fikentscher value of 44.2% in 2-butanone. The emulsion by analysis contained 0.38% by weight unsaturation.

The copolymer latex as above obtained, including the various emulsions prepared in accordance with the following examples, may be spray dried while employing the conventional Bowen spray dryer. Prior to use of the latter, it is washed with water and dried. The hot air feed is heated to 435° F. (224° C.) and the copolymer latex pumped at about 60° C. to the air-driven atomizer operated with 100 lbs. air pressure.

The product as obtained above, was spray dried while employing 4 different concentrations. From the following data, it was concluded that a 15% solids latex can be dried satisfactorily in a laboratory size Bowen spray dryer, to a soft, white, finely divided powder.

*Spray Drying Data*

| Solids | Inlet Temp., °C. | Inlet Temp., °F. | Wall Temp., °C. | Wall Temp., °F. | Temp. Feed | Feed Rate, gal. per hour | Remarks |
|---|---|---|---|---|---|---|---|
| 7.1 | 224 | 435 | 140 | 284 | 60 | 2-3 | Dried satisfactorily to a fine, white powder. |
| 15.0 | 224 | 435 | 140 | 284 | 60 | 2-3 | Do. |
| 19.8 | 224 | 435 | 140 | 284 | 60 | 2-3 | Unsatisfactory, grainy, pellets, some stringing. |
| 19.8 | 250 | 480 | 150 | 302 | 60 | 2-3 | Do. |
| 24.7 | 250 | 480 | 150 | 302 | 60 | 2-3 | Unsatisfactory, stuck to walls of dryer. |

EXAMPLE II

Into a five-liter, Pyrex flask equipped with a stirrer, a thermometer, a reflux condenser, a gas nitrogen inlet and a heating bath was charged 344.0 grams (4.0 moles) of distilled vinyl acetate, 444.0 grams (4.0 moles) of distilled 1-vinyl-2-pyrrolidone, 1000.0 grams of freshly boiled distilled water and 4.0 grams of 2,2'-azodiisobutyronitrile.

The flask was flushed with nitrogen gas and the gas inlet rate was adjusted to about 30 bubbles per minute. The flask was then heated by means of the heating bath to give a gentle reflux (ca. 74° C.).

Below is the log of the reaction:

| Time | Temperature (° C.) | Stirrer (r.p.m.) | Comments |
|---|---|---|---|
| 9:15 | 71 | ca. 90% | Cloudy mixture, two phase. |
| 9:20 | 70 | ca. 90% | Do. |
| 9:27 | 74 | ca. 90% | Slight reflux. |
| 9:30 | 74 | ca. 90% | Heat off, cooled with tap water. |
| 9:45 | 74 | ca. 90% | Heat on, cloudy mixture. |
| 10:00 | 74 | ca. 90% | Heat on, liquid appears more transparent. |
| 11:00 | 76 | ca. 90% | Slight reflux, very viscous white emulsion. |
| 11:08 | 83 | ca. 90% | Steam on, very little reflux. |
| 11:20 | 85 | ca. 90% | Steam on, reflux stopped. |
| 12:50 | 81 | ca. 90% | White emulsion, very high viscosity. |
| 15:30 | 70.5 | ca. 90% | No reflux, solution very viscous. |
| 21:30 | | | Stopped heating and stirring. The product was a white, viscous emulsion. A nitrogen content of the dried copolymer of 7.43% indicated the polymer contained 59% 1-vinyl-2-pyrrolidone and 41% vinyl acetate. The dried material gave a Fikentscher K value of 68 in water. The emulsion contained less than 0.5% free monomer. |

EXAMPLE III

Into a 100 gallon polymerization kettle equipped with a heavy-duty agitator, the requisite inlet lines, and an inert gas inlet was charged 80.0 lbs. of distilled 1-vinyl-2-pyrrolidone, 120.0 lbs. of distilled vinyl acetate and 300.0 lbs. of deionized water.

The kettle was sealed and flushed with the inert gas. The kettle was then stirred and heated to 65° C. At this time 3.2 ounces of 2,2'-azodiisobutyronitrile was added to the kettle. The temperature was then raised to about 70–75° C. and about 8 to 10 pounds of pressure. These conditions were maintained for 2 hours. At the end of the 2 hours the temperature was raised to 80° C.

A vacuum of about 18–22 inches was applied to the kettle for one hour. This treatment reduced the residual unsaturation from 1% to less than 0.5%. The product obtained was a stable, white emulsion.

In the following table are given some data to show the operable limits of the emulsion system. An examination of these data show that stable emulsions are obtained from those preparations containing 40 to 59% 1-vinyl-2-pyrrolidone and from 60 to 41% vinyl acetate:

From the foregoing example, it is clearly evident that in order to obtain good stable emulsions it is necessary, in fact imperative, that the ratio of monomers be in the exact proportion. In other words, the percent of N-vinyl pyrrolidone to the percent of vinyl ester should be within 40% to 60% and 60% to 40% respectively. This same ratio also applies to specific copolymers of N-vinyl pyrrolidone and vinyl acetate.

EXAMPLE IV

Example I was repeated with the exception that the vinyl acetate was replaced by an equivalent amount of vinyl propionate. A solids determination of the emulsion at the end of 5 hours showed a conversion and yield of approximately 95%, which was indicative that the copolymerization reaction was practically complete. The final product was a light emulsion which, by analysis showed 0.35% by weight of unsaturation.

EXAMPLE V

Example I was again repeated with the exception that the vinyl acetate was replaced by an equivalent amount of vinyl laurate. The final product was a stable white emulsion.

In lieu of the several species of N-vinyl-2-pyrrolidones, I also found that other heterocyclic nitrogeneous vinyl monomers may be readily copolymerized with vinyl esters to yield stable white emulsions in accordance with the process of my invention. Such monomers include N-vinyl-2-oxazolidone, which is characterized by the following general formula:

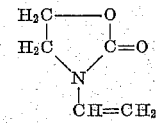

and is readily prepared by the dihydrochlorination of N(beta-chloroethyl) oxazolidone with metallic potassium in tertiary butyl alcohol or by the reaction of sodium methylate with the 2-chloroethyl ester of 2-chloroethyl carbamic acid in tetrahydrofuran as solvent, as is more fully described in the Journal of Organic Chemistry, volume 22, pages 849 to 851, July 1957. In addition to N-vinyl-2-oxazolidone, I may also employ N-vinyl-5-methyl-oxazolidone.

They also include N-vinylimidazole having the following formula:

which is commercially available on the open market. Instead of this particular monomer I also may employ 2-vinyloxymethylimidazole.

| Exp. No. | Percent V.P. | Percent V.A. | Appearance | Quality of Emulsion |
|---|---|---|---|---|
| 3563-274 | 20 | 80 | White, two layers. | Poor. The emulsion on standing separated into two layers. A watery layer on top amounted to about 30%. The bottom layer was white and very viscous. In fact the lower layer had a much higher viscosity after settling than the original prep. |
| 3563-272 | 40 | 60 | White | Good, stable emulsion. There was no separation after standing 1 year. |
| 3162-53 | 59 | 41 | do | Good stable emulsion. There was no separation after standing 4 years. |
| 2841-52 | 80 | 20 | Slightly yellow transparent solution. | This preparation gave a hazy, yellowish solution. It is not considered an emulsion. |

Additional examples of such monomers include N-vinyl-3-morpholinones characterized by the following formulae:

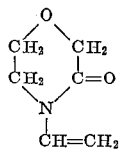

N-vinyl-3-morpholinone

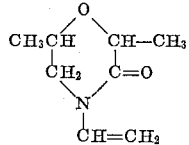

N-vinyl-2,6-dimethyl-3-morpholinone

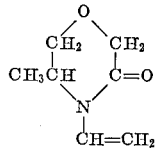

N-vinyl-5-methyl-3-morpholinone

The foregoing N-vinyl-3-morpholinones are readily obtained by first reacting methyl substituted or unsubstituted 3-morpholines with acetylene at elevated temperatures in the presence of a strongly basic agent. The methyl substituted and unsubstituted 3-morpholines reactive with acetylene are more fully described in the application of R. L. Mayhew and S. A. Glickman, Serial No. 781,440, filed on December 19, 1958, now abandoned, the entire specification of which is incorporated herein by reference thereto. The reaction of such methyl substituted and unsubstituted 3-morpholines with acetylene is carried out in any conventional pressure tight vessel in accordance with the procedure described in the pending application of S. A. Glickman, Serial No. 781,438, filed on December 19, 1958, now abandoned, the entire teachings of which are incorporated herein by reference thereto.

I claim:

1. The process of preparing emulsions of a copolymer of N-vinyl pyrrolidone and a vinyl ester of an acid of the fatty acid series containing from 1 to 18 carbon atoms which consists essentially of copolymerizing 1–1.5 moles of an N-vinyl pyrrolidone with 1.3–2.0 moles of said vinyl ester in an aqueous system in the presence of at least 1 polymerization catalyst selected from the group consisting of organic peroxides and 2,2'-azodiisobutyronitrile and in the presence of an inert gas with continuous stirring at reflux temperature for a period of time sufficient to form an emulsion and recovering the said emulsion.

2. The process of preparing emulsions of a copolymer of N-vinyl pyrrolidone and vinyl acetate which consists essentially of copolymerizing 1–1.5 moles of an N-vinyl pyrrolidone with 1.3–2.0 moles of vinyl acetate in an aqueous system in the presence of at least 1 polymerization catalyst selected from the group consisting of organic peroxides and 2,2'-azodiisobutyronitrile and in the presence of an inert gas with stirring at reflux temperature for a period of time sufficient to form an emulsion and recovering said emulsion.

3. The process according to claim 1 wherein the N-vinyl pyrrolidone is 5-methyl-N-vinyl-2-pyrrolidone.

4. The process according to claim 1 wherein the N-vinyl pyrrolidone is 5-ethyl-N-vinyl-2-pyrrolidone.

5. The process according to claim 1 wherein the N-vinyl pyrrolidone is 3-methyl-N-vinyl-2-pyrrolidone.

6. The process according to claim 1 wherein the N-vinyl pyrrolidone is 3-ethyl-N-vinyl-2-pyrrolidone.

7. The self-emulsifiable product obtained by spray drying of the emulsion prepared in accordance with claim 1.

8. The self-emulsifiable product obtained by spray drying of the emulsion prepared in accordance with claim 2.

9. The emulsion prepared in accordance with the process of claim 1.

10. The emulsion prepared in accordance with the process of claim 2.

References Cited in the file of this patent

UNITED STATES PATENTS

| | | |
|---|---|---|
| 2,497,705 | Wertz | Feb. 14, 1950 |
| 2,667,473 | Morner et al. | Jan. 26, 1954 |

FOREIGN PATENTS

| | | |
|---|---|---|
| 722,790 | Great Britain | Jan. 26, 1955 |

OTHER REFERENCES

Schildknecht: "Vinyl and Related Polymers" (pages 9, 16–18, 86, 91, 224, 225, 263, 264, 334, and 397), Wiley (1952).